(12) United States Patent
Debecker et al.

(10) Patent No.: US 10,786,868 B2
(45) Date of Patent: Sep. 29, 2020

(54) LASER NOZZLE WITH MOBILE ELEMENT

(75) Inventors: Isabelle Debecker, Paris (FR); Thomas Jouanneau, Grenoble (FR); Philippe Lefebvre, Meulan (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 1682 days.

(21) Appl. No.: 14/117,915

(22) PCT Filed: Apr. 25, 2012

(86) PCT No.: PCT/FR2012/050907
§ 371 (c)(1),
(2), (4) Date: Nov. 15, 2013

(87) PCT Pub. No.: WO2012/156608
PCT Pub. Date: Nov. 22, 2012

(65) Prior Publication Data
US 2014/0069898 A1    Mar. 13, 2014

(30) Foreign Application Priority Data

May 16, 2011  (FR) ..................... 11 54224

(51) Int. Cl.
*B23K 26/14* (2014.01)
*B23K 26/064* (2014.01)
*B23K 26/38* (2014.01)

(52) U.S. Cl.
CPC ............ *B23K 26/14* (2013.01); *B23K 26/064* (2015.10); *B23K 26/1462* (2015.10); *B23K 26/38* (2013.01)

(58) Field of Classification Search
CPC .......................... B23K 26/0051; B23K 26/265
USPC ....................... 219/50, 162, 121.6, 121.67
See application file for complete search history.

(56) References Cited

U.S. PATENT DOCUMENTS

| 4,027,137 A * | 5/1977 | Liedtke | ................ B23K 26/123 |
| | | | 219/121.6 |
| 4,031,351 A | 6/1977 | Martin | |
| 6,797,917 B1 * | 9/2004 | Yamaoku | ........... B23K 26/0734 |
| | | | 219/121.67 |

FOREIGN PATENT DOCUMENTS

| EP | 1669159 | 6/2006 |
| JP | 6137393 | 2/1986 |
| JP | 626790 | 1/1987 |
| JP | 6340595 | 2/1988 |

(Continued)

OTHER PUBLICATIONS

PCT/FR2012/050907 Search Report, dated Aug. 31, 2012.
Written Opinion for corresponding PCT/FR2012/050907, dated Aug. 31, 2012.

*Primary Examiner* — Tu B Hoang
*Assistant Examiner* — Thomas J Ward
(74) *Attorney, Agent, or Firm* — Elwood L. Haynes

(57) ABSTRACT

The invention relates to a laser nozzle that can be used in laser cutting, notably with a fibre or disc laser, comprising a nozzle body comprising an axial housing passing axially through said nozzle body and comprising a first outlet orifice situated at the front face of the nozzle body, and a movable element comprising a skirt-forming front part arranged in the axial housing of the nozzle body, said movable element being capable of translational movement in the axial housing of the nozzle body and comprising an axial passage with a second outlet orifice opening onto the skirt-forming front part.

6 Claims, 3 Drawing Sheets

(56) References Cited

FOREIGN PATENT DOCUMENTS

JP              63108992        5/1988

\* cited by examiner

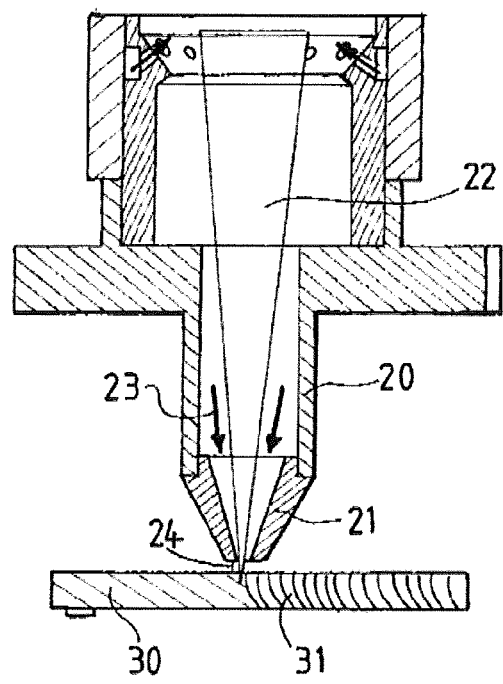
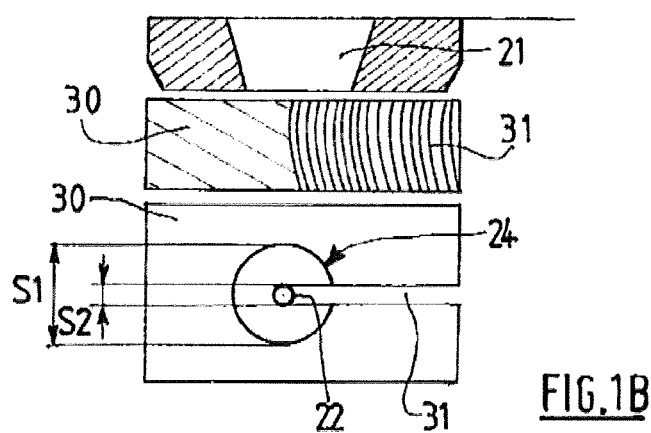
FIG.1A
FIG.1B

LASER NOZZLE WITH MOBILE ELEMENT

CROSS REFERENCE TO RELATED APPLICATIONS

This application is a 371 of International PCT Application PCT/FR2012/050907, filed Apr. 25, 2012, which claims priority to French Application No. 1154224, filed May 16, 2011, the entire contents of which are incorporated herein by reference.

BACKGROUND

The invention concerns a laser nozzle that can be used in laser-beam cutting with an internal movable element comprising a skirt for concentrating the cutting gas in the cutting kerf.

Cutting by laser beam requires the use of a nozzle, generally made from copper, having the effect of channelling the gas and allowing the laser beam to pass.

The nozzles typically have diameters of their outlet orifice lying between 0.5 and 3 mm for a working distance of between 0.6 and 2 mm.

In order to allow cutting, it is necessary to use high pressures, in general of several bar, in the focusing head in order to enable the gas to enter the kerf in order to drive out the molten metal.

However, a major part of the gas used, typically between 50% and 90%, has no action on the cutting process, that is to say on the expulsion of the molten metal, since it starts on the sides of the cutting kerf.

These losses of gas are in fact due to the enormous difference between the cross section of flow of the nozzle orifice and the size of the focal spot. Thus, by way of indication, the cross section of flow of the nozzle with an outlet orifice with a diameter of 1.5 mm is 25 times greater than the cross section of the focal spot created by the laser beam passing through this nozzle.

However, if an insufficient proportion of gas is used, there is then an appearance of cutting defects, in particular adherent flash and/or traces of oxidation.

Attempting to remedy this by reducing the diameter of the nozzle orifice is not ideal since the risk is then taken of seeing the laser beam strike the inside of the nozzle and damage it, which moreover also impairs the cutting quality and/or the performance.

There exist moreover a certain number of documents proposing various solutions for attempting to assist the entry of the gas in the kerf, for example EP-A-1669159, JP-A-62006790, JP-A-61037393, JP-A-63108992, JP-A-63040695 and U.S. Pat. No. 4,031,351.

However, none of these solutions is truly ideal since they often have an architecture that is complex to implement, with a size greater than that of a commercial nozzle, and/or having limited efficacy. Furthermore, the existing solutions are not suited to use in industrial laser cutting.

In particular, the document U.S. Pat. No. 4,031,351 discloses a laser cutting nozzle, comprising a movable element the end of which is pressed against the surface of the part to be cut in order to assist the injection of the cutting gas into the kerf. To do this, the nozzle is provided with a spring exerting a pressure on the movable element in order to move it in the direction of the part to be cut and to hold it against the surface of said part.

However, this solution proposes several major problems, in particular in the context of industrial use.

First of all, the force exerted by the spring, added to the pressure of the cutting gas, leads the movable element to exert a high force on the part to be cut. The result is a risk of deformation of the metal sheet from which the part is cut, friction and scratches on the surface of the sheet, or even entrainment, i.e. movement, of the sheet, which is in general simply placed on the table of the industrial cutting machine. These risks are all the greater, the thinner the metal sheet.

The presence of an O-ring seal between the end of the movable element and the surface of the part further contributes to increasing the friction forces on the metal sheet and poses a problem in terms of service life of the movable element, because of the very high temperatures encountered at this level of the nozzle, where the laser beam has its highest power density and where the risks of splashing of molten metal are great.

Finally, this solution also poses a problem during phases of rapid movements of the cutting head above the metal sheet, without a cutting gas or a beam delivered, in particular in the context of cuts of contiguous parts, or during phases of piercing the metal sheet that generate significant splashes of molten metal. In these situations, permanent contact of the nozzle with the sheet is therefore to be proscribed.

The problem that is posed is consequently that of being able to improve the efficacy of the gas used in laser cutting by increasing the proportion of gas having an action on the expulsion of the molten metal and consequently reducing the total quantity of gas used and the gas pressure necessary while limiting the proportion of gas lost, and this by proposing a solution that can be implemented on an industrial level and does not make the laser cutting device excessively complex.

SUMMARY

The solution of the present invention is a laser nozzle comprising:
 a nozzle body comprising an axial housing passing axially through said nozzle body and comprising a first outlet orifice situated at the front face of the nozzle body, and
 a movable element comprising a front part forming a skirt, arranged in the axial housing of the nozzle body, said movable element being capable of translational movement in the axial housing of the nozzle body and comprising an axial passage with a second outlet orifice (12) emerging at the front part forming a skirt, characterised in that:
 the movable element is able to move translationally in the axial housing in the direction of the first outlet orifice under the effect of a gas pressure exerted on the movable element until the front part forming a skirt of the movable element comes to project outside the axial housing through the first outlet orifice in the front face of the nozzle body, and
 an elastic element is arranged in the axial housing, between the nozzle body and the movable element, said elastic element exerting an elastic return force on the movable element tending to oppose the translation movement in the axial housing in the direction of the first outlet orifice.

According to circumstances, the nozzle of the invention may comprise one or more of the following technical features:
 when the movable element moves translationally in the axial housing in the direction of the first outlet orifice situated at the front face of the nozzle body, the front part forming a skirt of the movable element projects outside the axial housing through the first outlet orifice of the front face of the nozzle body;

the bottom of the axial housing of the nozzle body comprises a shoulder, and the peripheral wall of the movable element comprises a stop, the elastic element being positioned between the shoulder and the stop;

at least one sealing element is arranged between the nozzle body and the movable element, for example one or more O-ring seals;

said at least one sealing element is arranged in a peripheral groove provided in the external peripheral wall of the movable element;

the movable element is able to move between several positions comprising:
  an idle position in which the skirt of the front part is completely or almost completely retracted in the axial housing of the nozzle body, and
  a working position in which the skirt of the front part projects completely or almost completely outside the axial housing of the nozzle body, through the first outlet orifice;

the axial passage of the movable element has a profile with a conical, frustoconical or convergent/divergent shape;

the nozzle body is made from an electrically conductive material, in particular copper, brass or the like;

the movable element is formed wholly or partly from an electrically insulating material;

alternatively, a movable element is made from a material that is electrically conductive and resistant to temperature/heat, in particular copper, brass or the like, said insulating element comprising at least one insulating interface arranged between the nozzle and the wall of the movable insert. The insulating interface is either a sleeve arranged in the nozzle body or an insulating cladding carried by the nozzle body or the movable element.

The invention also relates to a laser focusing head comprising at least one focusing optic, for example one or more lenses or mirrors, in particular a focusing lens and a collimation lens, characterised in that it also comprises a laser nozzle according to the invention.

Moreover, the invention also concerns a laser installation comprising a laser generator, a laser focusing head and a laser beam conveying device connected to said laser generator and to said laser focusing head, characterised in that said laser focusing head is in accordance with the invention.

Preferably, the laser generator or source is of the $CO_2$, YAG, fibre or disc type, preferably of the fibre or disc type, in particular an ytterbium fibre laser source.

According to yet another aspect, the invention also relates to a laser beam cutting method in which use is made of a nozzle according the invention, a laser focusing head according to the invention or an installation according to the invention.

BRIEF DESCRIPTION OF THE DRAWINGS

The invention will now be better understood by means of the following description given with reference to the accompanying figures. For a further understanding of the nature and objects for the present invention, reference should be made to the following detailed description, taken in conjunction with the accompanying drawings, in which like elements are given the same analogous reference numbers and wherein:

FIG. 1A shows schematically a focusing head of a conventional laser cutting installation, FIG. 1B shows schematically the size of the laser spot compared with the size of the nozzle orifice.

DESCRIPTION OF PREFERRED EMBODIMENTS

Figure 2:
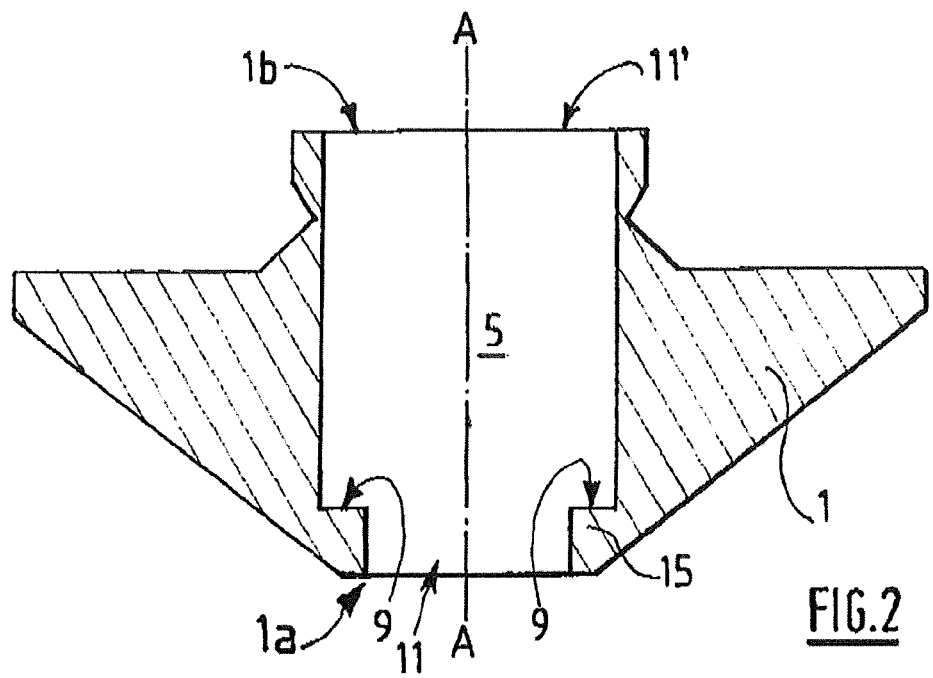
FIG. 2 is a diagram in cross section of the body of a nozzle according to the invention.

FIG. 1A shows the focusing head 20 of a conventional laser cutting installation, to which there is fixed a conventional laser nozzle 21 through which there pass a focused laser beam and assistance gas (arrow 23) serving to expel the metal melted by the beam out of the cutting kerf 31 formed by the beam 22 in the metal part to be cut 30, for example a steel or stainless steel sheet.

The assistance gas may be an active gas, such as oxygen, air, $CO_2$ or hydrogen, or an inert gas such as argon, nitrogen or helium, or a mixture of several of these active and/or inert gases. The composition of the gas is chosen in particular according to the nature of the part to be cut.

The beam that impacts the part will melt therein the metal, which will be expelled below the part by the pressure of the assistance gas.

FIG. 1B shows clearly the cross section of flow S1 of the orifice 24 of the nozzle 21 compared with the size S2 of the focal spot of the beam 22. As can be seen, the section S1 is very much greater than the size S2 of the focal spot of the beam 22, which, with conventional nozzles, gives rise to a high consumption of assistance gas, only a small proportion of which will serve to expel the molten metal out of the cutting kerf 31.

In order to considerably reduce the consumption of gas as well as the pressure necessary for cutting, the present invention proposes an improved laser nozzle suitable and designed for cutting with a laser beam using a gas flow rate and/or gas pressure reduced by virtue of a particular nozzle architecture making it possible to force a greater proportion of gas to enter the kerf 31 and to effectively expel the molten metal therein, and this whatever the laser power and the wavelength of the beam.

Figure 3:
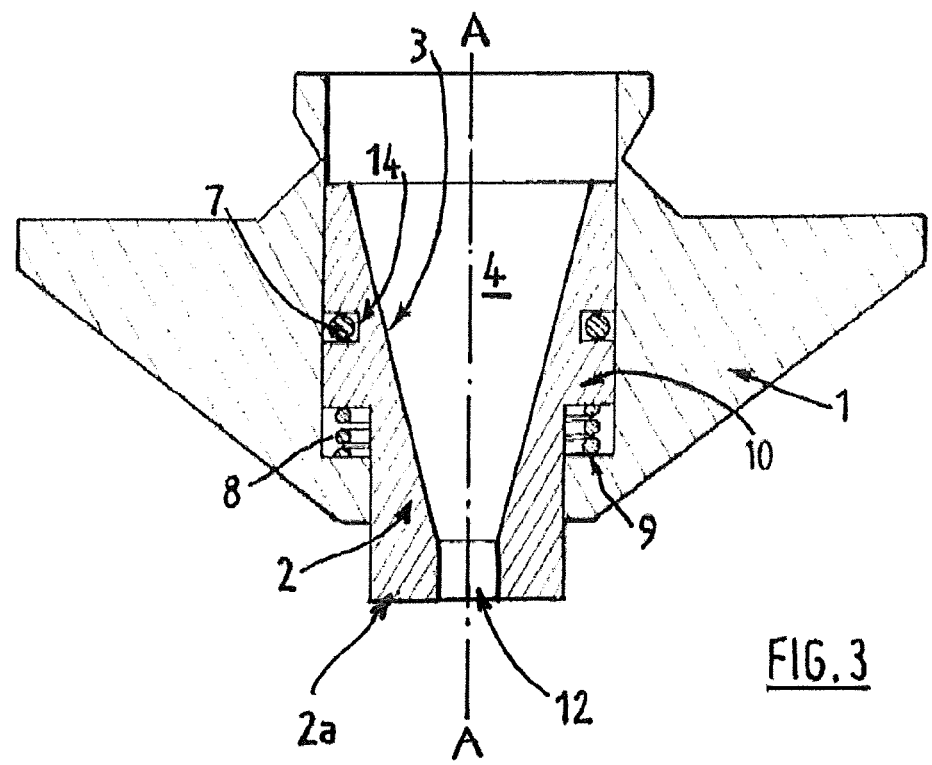
FIG. 3 is a diagram in cross section of a nozzle according to the invention.

According to the invention, the laser nozzle comprises at least two essential components, namely a nozzle body 1 cooperating with a movable element 2 arranged so as to be able to move inside the body 1 of the nozzle, an embodiment of which is illustrated in FIGS. 2 and 3.

More precisely, as can be seen in FIG. 2, the nozzle body 1, which is formed from a conductive material, for example copper or brass, is intended to be fixed to the laser focusing head 20 of the laser installation.

Advantageously, the nozzle body 1 is a part of revolution that has an axial housing 5 of axis AA, which extends from the rear face 1b of the body 1 as far as a front face 1a of said body 1, passing right through it.

The axial housing 5 emerges at the two front 1a and rear 1b faces of the nozzle body 1. The rear face 1b therefore carries a first inlet orifice 11' whereas the front face 1a carries a first outlet orifice 11 of the nozzle body 1, the first inlet 11' and outlet 11 orifices being coaxial of axis AA.

This axial housing 5 is in fact a recess, for example cylindrical in shape, comprising an internal shoulder 9 projecting radially towards the centre of the housing 5, said internal shoulder 9 being formed by a restriction 15 of the cross section of the axial housing 5 at the first outlet orifice 11 situated at the front face 1a of the nozzle body 1.

The nozzle of the invention also comprises a movable element 2 inserted in the housing 5 of the nozzle body 1, as can be seen in FIG. 3. This movable element 2 is suitable and designed for moving translationally along the axis AA inside the housing 5 of the nozzle body 1.

More precisely, this movable element 2 comprises a front part 2a forming a skirt 6, typically cylindrical in shape, that is to say tubular, arranged in the axial housing 5 of the nozzle body 1 and comprising an axial passage 4 with a second outlet orifice 12 emerging at the front part 2 forming said skirt 6.

During the use of the nozzle, the laser beam 22 and the assistance gas 23 pass through the axial passage 4 of the movable element 2 and emerge through the second outlet orifice 12 emerging at the front part 2 forming said skirt 6.

The movable element 2 is preferentially formed by an insulating material, composite or not, for example polyetheretherketone (PEEK), Vespel®, ceramic or Pyrex, and repeats the internal geometry of a laser cutting nozzle, that is to say it may have an internal profile, i.e. the axial passage 4 may have a profile, conical in shape, with a non-cylindrical outlet channel, frustoconical, of the convergent/divergent type (i.e. Laval nozzle) or any other suitable geometry.

The movable element 2 is able to move axially with respect to the body 1 of the nozzle along the axis AA. In fact, the movable element 2 moves under the effect of the pressure of the assistance gas 23 that is exerted on said movable element 2, which tends to push it in the direction of the part to be cut 30.

Figures 4A, 4B:
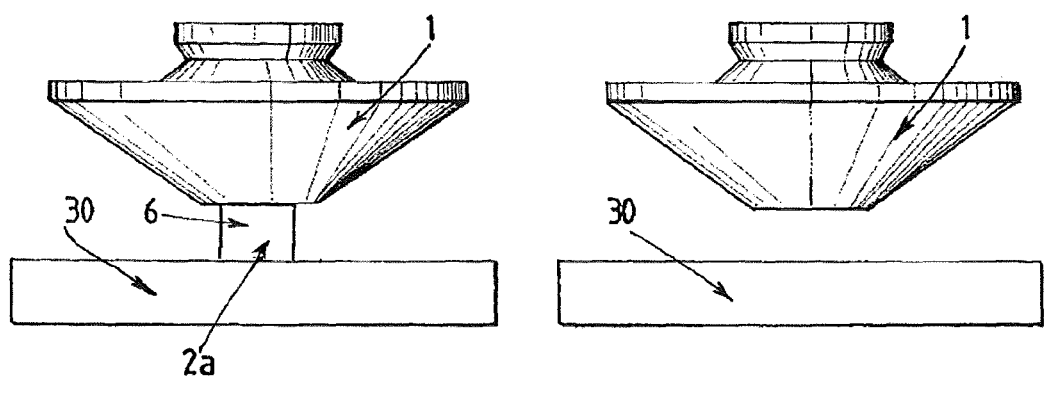
FIGS. 4A and 4B show the nozzle of the invention with the movable element in two different positions.

The translational movement of the movable element 2 along the axis AA will cause the skirt 6 to move closer to the top surface 30 of the sheet to be cut, which will come into contact with each other, as illustrated in FIG. 4A.

Thus the gas will be channelled by the skirt 6 and be concentrated at the laser spot and therefore the kerf, which will greatly improve its efficacy and the expulsion of the metal will take place better.

An elastic element 8, such as a spring, is arranged in the axial housing 5, between the nozzle body 1 and the movable element 2 so as to exert an elastic return force on the movable element 2 in a direction tending to move it away from the part to be cut.

Thus, at the end of cutting, when the gas is cut off and the gas pressure ceases to be exerted on the movable element 2, the latter can be returned to its idle position and therefore the skirt 6 to return inside the housing 5, as illustrated in FIG. 4B.

In addition, the elastic element 8 makes it possible to limit the pressure exerted by the movable element 2 on the part to be cut when said movable element moves in the direction of the part under the effect of the cutting gas. More precisely, the return force of the elastic element 8 is advantageously sized so as to keep the movable element 2 in contact with the part to be cut while limiting the pressure that said element exerts on the metal sheet, in order to greatly minimise or even eliminate any risk of deformation, scratches or entrainment of the sheet from which the part is cut.

In addition, the elastic element 8 facilitates the rapid movements of the cutting head at a short distance above the sheet, without any cutting gas or beam, since the gas pressure then ceases to be exerted on the movable element and the skirt 6 returns inside the housing 5.

In this way, it is possible to make only the skirt rise, without necessarily having to raise the focusing head supporting the nozzle of the invention, which greatly facilitates the implementation of the cutting method on an industrial level.

The elastic element 8 also makes it possible to limit the phenomenon of wear on the skirt 6 during phases of piercing the sheet that generally precede the cutting phases. This is because the piercing is usually carried out with low gas pressures, typically less than 4 bar. The elastic element then exerts a sufficient return force for the skirt 6 to rise completely or almost completely into the housing 5 and thus be protected from the splashings of molten metal generated by the piercing.

It should be noted that the external peripheral wall of the movable element 2 comprises a stop, preferably an annular stop extending over all or part of the periphery of said movable element 2, the elastic element 8 being positioned between the shoulder 9 and the stop 10.

In fact, the movable element 2 of the nozzle according to the invention is therefore able to move between several positions comprising at least:

an idle position in which the skirt 6 of the front part 2a is completely or almost completely retracted in the axial housing 5 of the nozzle body 1, as illustrated in FIG. 4B, and a working position in which the skirt 6 of the front part 2a projects completely or almost completely outside the axial housing 5 of the nozzle body 1, through the first outlet orifice 11, and comes into contact with the part to be cut, as illustrated in FIG. 4A.

Naturally the movable element 2 can occupy intermediate positions in which the skirt 6 only partially projects outside the axial housing 5 of the nozzle body 1. These intermediate positions may in particular depend on the pressure exerted by the gas on the movable element 2.

Optionally, at least one sealing element 7 is arranged between the nozzle body 1 and the movable element 2, in particular one or more O-ring seals 7, which provides a seal between the nozzle body 1 and the movable insert 2.

As can be seen in FIG. 3, the nozzle of the invention is of standard size, that is to say its size is not increased compared with a conventional cutting nozzle, which is advantageous and compatible for contiguous cuts, that is to say on parts within the same metal sheet with very little separation between the various parts.

In addition, the nozzle of the invention has the other advantage of being compatible with capacitive sensor systems. This is because the part made from copper or other conductive material adapts to the height specified by the capacitive sensor, like a standard nozzle. It is the movable insert 2 which, under the gas pressure, comes into contact with the sheet 30 to be cut and thus limits gas leakages.

The nozzle of the invention comprises a movable element 2 where the diameter of the outlet orifice 12 is between 0.5 and 5 mm. Preferably, the front part 2a of the movable element 2 has an external diameter of between 3 and 8 mm, preferably again around 6 mm.

EXAMPLES

In order to show the efficacy of the nozzle according the invention compared with a standard nozzle and therefore the advantage of forcing the gas into the cutting kerf by means of the use of a skirt mounted on a movable element, comparative tests are carried out using a cutting installation with a laser generator of the $CO_2$ type in order to generate a laser beam that is brought to a laser focusing head comprising focusing optics, namely lenses.

The laser focusing head is equipped, according to circumstances, with a standard nozzle with an outlet orifice 1.8 mm in diameter or a nozzle according to FIG. 3 with a cylindrical movable skirt and a cylindrical outlet channel 1.8 mm in diameter.

The assistance gas used is nitrogen.

The part cut is a sheet of 304 L stainless steel 5 mm thick.

The laser beam has a power of 4 kW and the cutting speed is 2.6 m/min.

The results obtained showed that:
- with the standard nozzle, a gas pressure of 14 bar is insufficient to obtain a quality cut. This is because, at 14 bar, the cutting edges comprise numerous adherent burrs. This demonstrates that the molten metal discharges badly because of insufficient action of the gas on the molten metal that is to be expelled. In order to eliminate these burrs, a pressure of 16 bar was necessary;
- with the nozzle of the invention, tests carried out at pressures ranging between 1 and 5 bar led to cuts of good quality, that is say with cutting edges with no adherent burrs. The skirt of the nozzle channels the gas into the groove and effectively expels the molten metal.

These tests demonstrate clearly the efficacy of the nozzle according to the invention, which makes it possible to considerably reduce the gas pressures to be used compared with a standard nozzle, all other conditions being equal, and therefore also to reduce the consumptions of gas.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A laser nozzle comprising:
a nozzle body comprising an axial housing passing axially through said nozzle body and comprising a first outlet orifice situated at a front face of the nozzle body and
a movable element comprising a front part forming a skirt, arranged in the axial housing of the nozzle body, said movable element being capable of translational movement in the axial housing of the nozzle body and comprising an axial passage with a second outlet orifice emerging at the front part forming the skirt, wherein:
the movable element is able to move translationally in the axial housing in the direction of the first outlet orifice under the effect of a gas pressure exerted on the movable element until the front part forming the skirt of the movable element comes to project outside the axial housing through the first outlet orifice in the front face of the nozzle body, and
an elastic element is arranged in the axial housing, between the nozzle body and the movable element, said elastic element exerting an elastic return force on the movable element tending to oppose the translation movement in the axial housing in the direction of the first outlet orifice,
wherein the movable element is able to move between several positions comprising:
an idle position in which the skirt of the front part retracted in the axial housing of the nozzle body, due to the return force provided by the elastic element, and
a working position in which the skirt of the front part projects outside the axial housing of the nozzle body, through the first outlet orifice, due to the effect of a gas pressure exerted on the movable element.

2. The nozzle of claim 1 wherein the movable element moves translationally in the axial housing in the direction of the first outlet orifice situated at the front face of the nozzle body, the front part forming a skirt of the movable element projects outside the axial housing through the first outlet orifice in the front face of the nozzle body.

3. The nozzle of claim 1, wherein the bottom of the axial housing of the nozzle body comprises a shoulder, and the peripheral wall of the movable element comprises a stop, the elastic element being positioned between the shoulder and the stop.

4. The nozzle of claim 1, wherein at least one sealing element is arranged between the nozzle body and the movable element.

5. The nozzle of claim 1, wherein at least one sealing element is arranged in a peripheral groove provided in the external peripheral wall of the movable element.

6. The nozzle of claim 1, wherein the axial passage of the movable element has a profile with a conical, frustoconical or convergent/divergent shape.

* * * * *